US010716075B1

(12) United States Patent
Choi et al.

(10) Patent No.: US 10,716,075 B1
(45) Date of Patent: Jul. 14, 2020

(54) TRANSMIT POWER CONTROL OF ACCESS POINT WITH ACTIVE SENSOR FEEDBACK

(71) Applicant: Cisco Technology, Inc., San Jose, CA (US)

(72) Inventors: Young Il Choi, San Jose, CA (US); Santosh Kulkarni, San Jose, CA (US); Vishal Satyendra Desai, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 16/295,370

(22) Filed: Mar. 7, 2019

(51) Int. Cl.
*H04W 52/36* (2009.01)
*H04W 52/34* (2009.01)

(52) U.S. Cl.
CPC ....... *H04W 52/367* (2013.01); *H04W 52/343* (2013.01); *H04W 52/362* (2013.01)

(58) Field of Classification Search
CPC ... H04W 84/12; H04W 52/242; H04W 52/54; H04W 52/04; H04W 52/146; H04W 52/18; H04W 52/24; H04W 52/243; H04W 52/245; H04W 52/248; H04W 72/0473
USPC ........................................................ 455/522
See application file for complete search history.

(56) References Cited

U.S. PATENT DOCUMENTS

| 8,874,154 | B1 | 10/2014 | Chhabra |
| 8,903,448 | B2 | 12/2014 | Chande et al. |
| 8,909,945 | B2 | 12/2014 | Rudolf et al. |
| 8,953,524 | B2 | 2/2015 | Bennet |
| 9,585,124 | B2 | 2/2017 | Diener et al. |
| 2014/0341128 | A1* | 11/2014 | Turtinen ............... H04W 28/18 370/329 |

OTHER PUBLICATIONS

Alizadeh, A., et al., "Camera-Assisted Radio Resource Management," Technical Disclosure Commons, Jun. 19, 2018, 8 pages.
Hühn, T., "A Measurement-Based Joint Power and Rate Controller for IEEE 802.11 Networks," PhD. Thesis, Berlin Institute of Technology, 2013, 126 pages.

* cited by examiner

*Primary Examiner* — Philip Sobutka
(74) *Attorney, Agent, or Firm* — Meunier Carlin & Curfman LLC

(57) ABSTRACT

The present disclosure is directed to the use of active feedback from client devices to limit/regulate transmission power control of access points from the perspective of the client device. The instant transmission power control beneficially ensures that clients located at a cell edge still receive sufficient coverage from access points and have sufficient overlap with adjacent cells for seamless roaming for the wireless stations while minimizing co-channel interference. In some embodiments, the present disclosure beneficially leverages 802.11h TPC Constraint to dynamically report client's view of the RF environment and cell size estimation.

19 Claims, 7 Drawing Sheets

| AP #1 TPC 8011h POWER CONSTRAINT | AP #2 (NEIGHBOR) RSSI | AP #3 (NEIGHBOR) RSSI | AP #4 (NEIGHBOR) RSSI | AP #5 (NEIGHBOR) RSSI | AP #6 (NEIGHBOR) RSSI | % OF COVERAGE (>-84dB) |
|---|---|---|---|---|---|---|
| 20 dB | -65 304a | -68 304b | -72 304c | -68 304d | -65 304e | 100% |
| 17 dB | -69 310a | -73 310b | -76 310c | -73 310d | -69 310e | 100% |
| 14 dB | -75 316a | -85 316b | -80 316c | -85 316d | -75 316e | 60% (3/5) |
| 11 dB | -80 | -86 | -85 | -88 | -80 322a | 50% |
| 8 dB | -83 | -88 | -88 | -88 | -83 324a | 40% (2/5) |
| 5 dB | -85 | -90 | -93 | -90 | -85 | 0% |
| 2 dB | -89 | -95 | -98 | -95 | -89 324b | 0% |

TRANSMIT POWER CONTROL OF ACCESS POINT WITH ACTIVE SENSOR FEEDBACK

TECHNICAL FIELD

Embodiments of the present invention relate to transmission power control of access points.

BACKGROUND

Power control generally involves the intelligent selection of transmitter power output in a communication system that achieves desired or specified performance while preventing, or limiting, unwanted interference between different wireless networks.

Dynamic Transmit Power Control (DTPC), Adaptive Radio Management (ARM), Ruckus's Resource Management, and like algorithms, typically set the transmit power of each access point to optimize the cell size based on inter-AP signal strength. That is, coverage is established based on an assessed signal strength between access points. For DTPC, the Neighbor Discovery Protocol (NDP) frame is used in the calculation of Tx power on a per-AP per-radio basis. However, this can still result in over-coverage and over co-channel interference for communication with the client device.

BRIEF DESCRIPTION OF THE DRAWINGS

The accompanying figures, which are incorporated herein and form part of the specification, illustrate transmit power control of access point with active feedback. Together with the description, the figures further serve to explain the principles of the multi-level resource reservation described herein and thereby enable a person skilled in the pertinent art to make and use the transmit power control of access point with active feedback.

FIG. 3 is a diagram showing generation of the coverage parameter value of FIG. 2A or 2B in accordance with an illustrative embodiment.

DESCRIPTION OF THE EXAMPLE EMBODIMENTS

Overview

Figure 1:
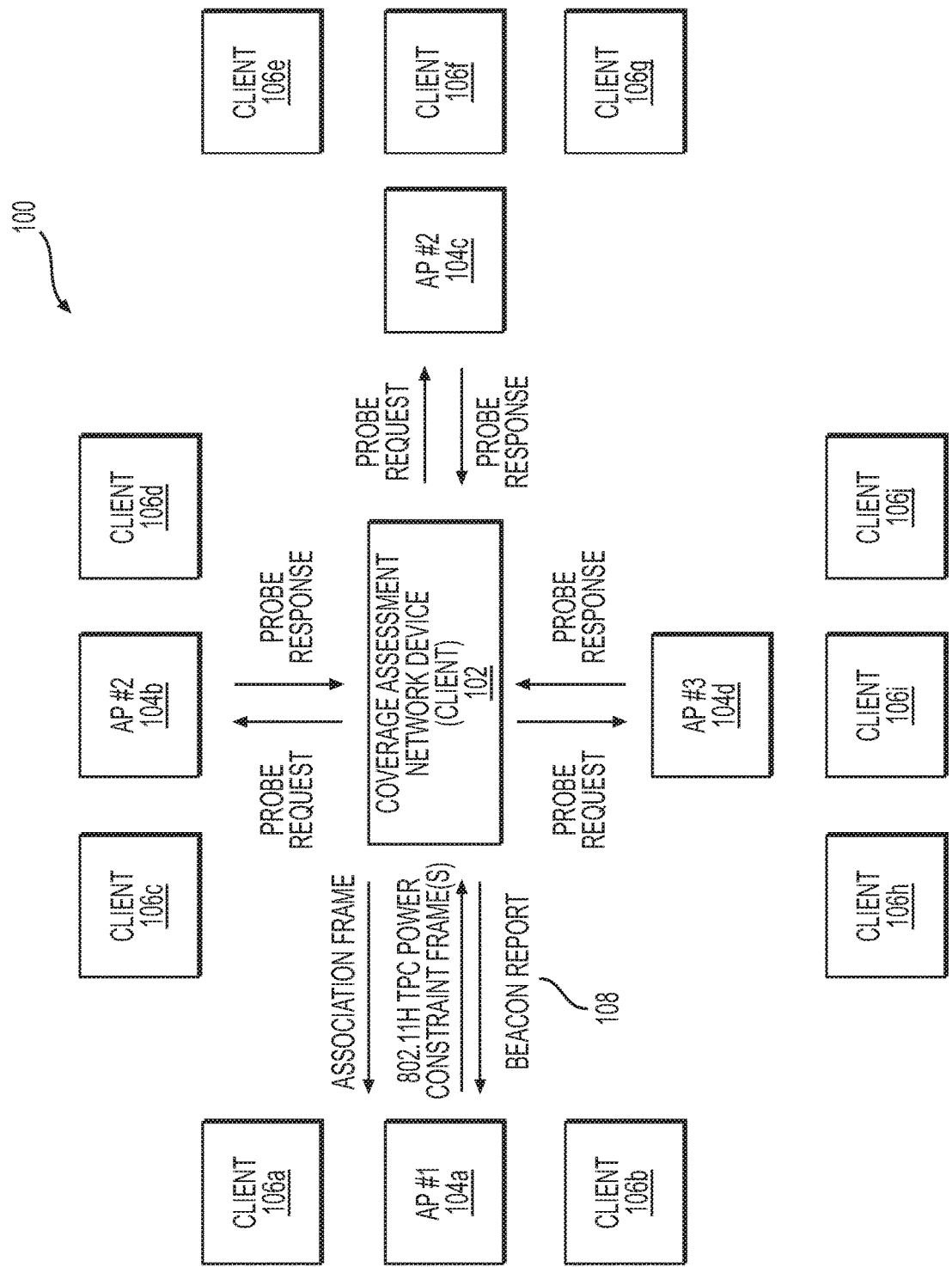
FIG. 1 is a diagram of a network with one or more client devices (e.g., a coverage-assessment network device) configured to provide active feedback to access points to limit transmit power control of the access points in servicing other client network devices in the network, in accordance with an illustrative embodiment.

The present disclosure is directed to the use of active feedback from client devices (or a coverage-assessment network device) to limit/regulate transmission power control of access points from the perspective of the client device. The instant transmission power control paradigm beneficially ensures that clients located at a cell edge can receive sufficient coverage from nearby access points and have sufficient overlap with adjacent cells for seamless roaming for the wireless stations while minimizing co-channel interference. In some embodiments, the present disclosure beneficially leverages 802.11h TPC Constraint to dynamically report client's views of the RF environment and cell size estimation. In some embodiments, the report is normalized with the station's beacon report to provide a view of the access point's cell coverage (e.g., at a geographic location distal to the access point, e.g., from or near the ground of a given floor in a building).

In an aspect, a system (e.g., an access point, e.g., a wireless access point, a wireless router, a wireless gateway device, a wireless switch, etc.) is disclosed that, e.g., can dynamically adjust RF coverage based on active feedback from client's view of the RF environment. The system includes a processor; and a memory having instructions stored thereon, wherein execution of the instructions by the processor cause the processor to: receive an association frame from a network device (e.g., a dedicated coverage-assessment network device, e.g., Active Sensor or a client emulating device) configured to assess coverage of access points in a campus network having a defined geographic area; transmit to the network device a first 802.11h TPC (transmit-power control) constraint frame designating a first power level (e.g., a device maximum power level, a user-defined operable maximum power level, an initial broadcast power level) at which the network device can maximumly transmit subsequent packets to access points in a network, wherein the network device is configured to transmit, following receipt of the first 802.11h TPC constraint frame, a set of probe requests to one or more neighbor access points, wherein each of the set of probe requests is used to determine an associated signal strength with each of the one or more neighbor access points; receive from the network device a beacon report (e.g., a Multi-Band Operation (MBO) enhanced beacon report or a Wifi-Agile MultiBand), or determine from data in the beacon report, a coverage parameter value that is associated with a number, or a percent, of the one or more neighbor access points having exceeded a pre-defined client signal threshold for the first power level defined in the first 802.11h TPC constraint frame; and re-transmit to the network device, one or more second 802.11h TPC constraint frames designating a set of second power levels at which the network device can maximumly transmit subsequent packets to access points in the network, wherein each of the set of second power levels has a value different from that of the first power level, wherein the one or more second 802.11h TPC constraint frames are re-transmitted until the coverage parameter value crosses a pre-defined coverage threshold or is within a range of coverage (e.g., a coverage between about 50% and 60%)

In some embodiments, each of the set of second power levels has a value that is less than that of the first power level.

In some embodiments, the pre-defined coverage threshold is between about 40 percent and about 60 percent of the one or more neighbor device covered.

In some embodiments, the pre-defined coverage threshold is user selectable (e.g., limited between 60-80%, e.g., for voice application).

In some embodiments, the set of probe requests triggers a set of corresponding probe responses from the one or more neighbor access points, wherein each of the set of corresponding probe responses includes a received signal strength indication (e.g., RSSI value) between the network device and a given neighbor access point of the one or more neighbor access points.

In some embodiments, the instructions by the processor further cause the processor to transmit to the network device a request for the beacon report.

In some embodiments, the beacon report comprises a list of neighboring radio's received signal strength indicator (RSSI) information collected at the network device (e.g., the Active Sensor).

In some embodiments, the instructions by the processor further cause the processor to transmit at least one of i) parameters in the first or one or more second 802.11h TPC constraint frames, ii) data in the received probe requests, and iii) data in the received beacon reports to at least one of the one or more neighbor access points, wherein the at least one of the i) parameters of the first or one or more second 802.11h TPC constraint frames, ii) the data in the received probe requests, and/or iii) the data in the received beacon reports is used by the one or more neighbor access points to establish a 802.11h TPC constraint frame to send to the network device.

In some embodiments, a probe request, of the set of probe requests, received from the network device in response to receipt of the first 802.11h TPC (transmit-power control) constraint frame, is used to normalize a beacon report prepared by the system to be transmitted to neighbor access points in the network.

In some embodiments, the pre-defined client signal threshold is set based on a selected QoS policy or a selected latency performance operation (e.g., for the system, application, etc.).

In some embodiments, each of the one or more second 802.11h TPC constraint frames includes a pre-defined adjustment (e.g., −3 dB) in current power level (e.g., wherein the pre-defined adjustment is based on a QoS policy for the system, application, etc. or a selected latency performance).

In some embodiments, the second power levels have values that adjust the power level according to a pre-defined linear relationship or a pre-defined exponential relationship (e.g., wherein the linear or exponential relationship is set based on a selected QoS policy or a selected latency performance).

In some embodiments, the instructions by the processor further cause the processor to receive from the network device, a set of capability parameters associated with the network device, wherein the set of capability parameters are used to determine a minimum or maximum power level to be used in the 802.11h TPC Constraint frame (e.g., to define 802.11h TPC Constraint Min/Max for the first or one or more second 802.11h TPC Constraint frames).

In some embodiments, at least one of the first power level of the first 802.11h TPC constraint frames and one or more of the set of second power levels of the one or more second 802.11h TPC constraint frames are determined from a QoS parameter and/or a latency criterion parameter (e.g., wherein QoS parameter and/or a latency criterion parameter are applied on the normalized probe RSSI to determine optimal Tx Power).

In some embodiments, the network device is configured to conduct coverage assessment of access points in the campus network based on defined policies (e.g., based on variations in client density at given times of the day or coverage holes reported in customer's environment; based on time of day, etc.).

In some embodiments, the instructions by the processor further cause the processor to identify potential incorrect assessment (e.g., of false positives or negatives) of a coverage hole events by comparing a neighbor RSSI to a last power level transmitted in a last 802.11h TPC (transmit-power control) constraint frame to the network device.

In some embodiments, the network device is a mobile phone, mobile device, tablet device, or laptop device having instructions executing thereon that generate the beacon report.

In some embodiments, the instructions by the processor further cause the processor to normalize the received beacon report of the network device with one or more received beacon reports of the one or more neighbor access points.

In another aspect, a system (e.g., active sensor; a client device; manager executing on a client device) is disclosed, the system comprising: a network interface; a processor; and a memory having instructions stored thereon, wherein execution of the instructions by the processor cause the processor to: transmit an association frame to a first access point; receive from the first access point a first 802.11h TPC (transmit-power control) constraint frame designating a first power level (e.g., a device maximum power level, a user-defined operable maximum power level, an initial broadcast power level) at which the network interface can maximumly transmit subsequent packets to access points in a network; transmit a set of probe requests to one or more neighbor access points; receive a set of corresponding probe responses, wherein the set of corresponding probe responses is used to determine an associated signal strength with each of the one or more neighbor access points for the first power level; transmit a beacon report (e.g., an MBO enhanced beacon report) comprising the associated signal strength, or a coverage parameter value derived therefrom, wherein the coverage parameter value corresponds to a number, or a percent, of the one or more neighbor access points having exceeded a pre-defined client signal threshold for the first power level defined in the first 802.11h TPC constraint frame; and for each second 802.11h TPC constraint frames received from the first access point, wherein each second 802.11h TPC constraint frames designates one of a set of second power levels at which the network interface can maximumly transmit subsequent packets to access points in the network, i) transmit one of a set of probe requests to the one or more neighbor access points, ii) determine an associated signal strength with each of the one or more neighbor access points for that power level, and iii) transmit the beacon report (e.g., an MBO enhanced beacon report) comprising the determined associated signal strength, or a coverage parameter value derived therefrom, for that second 802.11h TPC constraint frame; wherein each of the set of second power levels has a value different from that of the first power level, wherein the first access point is configured to re-transmit one or more second 802.11h TPC constraint frames until the coverage parameter crosses a pre-defined coverage threshold or is within a range of coverage (e.g., a coverage between about 50% and 60%)

In another aspect, a method is disclosed, e.g., for an access point to dynamically adjust RF coverage based on active feedback from client device based on the client's view of the RF environment. The method includes transmitting, from a network device (e.g., a dedicated coverage-assessment network device, e.g., an Active Sensor device or a client emulating device), to a first access point, an association frame; transmitting, from the first access point, to the network device, a first 802.11h TPC (transmit-power control) constraint frame designating a first power level (e.g., a device maximum power level, a user-defined operable maximum power level, an initial broadcast power level) at which the network device can maximumly transmit subsequent packets to access points in a network; transmitting, from the network device, to one or more neighbor access points, a set of probe requests, wherein each of the set of probe requests is used to determine an associated signal strength with each of the one or more neighbor access points; transmitting, from the network device, to the first access point, a beacon report (e.g., an MBO enhanced beacon report), or determine, by the first access point, from data in the beacon report, a coverage parameter value that is associated with a number, or a percent, of the one or more neighbor access points having exceeded a pre-defined client signal threshold for the first power level defined in the first 802.11h TPC constraint frame; and re-transmitting, from the first access point, to the network device, one or more second 802.11h TPC constraint frames designating a set of second power levels at which the network device can maximumly transmit subsequent packets to access points in the network, wherein each of the set of second power levels has a value different from that of the first power level, wherein the one or more second 802.11h TPC constraint frames are re-transmitted until the coverage parameter value crosses a pre-defined coverage threshold or is within a range of coverage (e.g., a coverage between about 60% to 80%)

Example Network Environment

FIG. 1 is a diagram of a network 100 with one or more client devices 102 (shown as a coverage-assessment network device 102) configured to provide active feedback to access points 104 (shown as 104a, 104b, 104c, 104d) to limit transmit power control of the access points in servicing other client network devices 106 (shown as 106a-106i), in accordance with an illustrative embodiment.

The coverage-assessment network device 102, in some embodiments, is a client emulating device that is configured to act as a client network device and provides a beacon report 108 that includes an assessed coverage parameter value associated with a number, or a percent, of the one or more neighbor access points having exceeded a pre-defined client signal threshold for the first power level defined in the first 802.11h TPC constraint frame. To this end, the coverage-assessment network device 102 provides coverage information as active feedback to each of the, or a subset of, access points (e.g., 104a-104d, etc.) to limit/regulate transmission power control of the access point (e.g., 104a-104d, etc.) from the perspective of the client device (e.g., 102). Indeed, the active feedback facilitates the determination of an optical cell size as provided by nearby access points from the perspective of the client device, rather than from inter-AP signal strength.

In some embodiments, the coverage-assessment network device 102 is configured to be placed a user-preferred or user-defined location (e.g., at a wall-receptacle not in proximity to the access points or at boundaries between access points). In some embodiments, the coverage-assessment network device 102 may be roamed during the assessment, e.g., for a given time of day. To this end, the feedback from the coverage-assessment network device 102 can be varied over a period of the day to establish a RF coverage site survey based on variations in client density at given times of the day or coverage holes reported in customer's environment.

Referring still to FIG. 1, one or more of the access points (e.g., 104a-104d, etc.) are configured with a client-aware Dynamic Transmit Power Control algorithm ("client-aware DTPC") that is configured to interrogate and use transmission coverage data from the coverage assessment network device 102. The client-aware Dynamic Transmit Power Control algorithm is configured, in some embodiments, to select a transmit power level that exceeds a defined coverage threshold. In other embodiments, the client-aware Dynamic Transmit Power Control algorithm is configured to select a transmit power level that provides for a range of specified coverage threshold (e.g., a coverage between about 50% and 60% of access points having a pre-defined signal strength). To this end, the co-channel interference can be reduced while ensuring that a sufficient number, or degree, of coverage is maintained. The term "access point" or "AP" may include, but is not limited to, a base station, a site controller, or any other type of interfacing device capable of operating in a wireless environment.

Other signal strength threshold may be assigned, for example, depending on manufacturer, equipment class, quality-of-service designation, etc. For example, a given manufacturer may designate −84 dB as a signal strength threshold for a good signal. Other manufacturer may designate −83 dB, −79 dB, etc. as such signal strength threshold. Similarly, manufacturers may have different signal strength thresholds assigned for different equipment classes. For example, 802.11 N access points for a given manufacturer may have a different signal strength threshold than that of 801.11a,b,g equipment. In some embodiments, the signal strength thresholds may be set based on the quality of service requirement for the equipment. The signal strength thresholds may be statically set and adjusted via input from the user. In some embodiments, the signal strength thresholds may be dynamically varied depending on transmitted QoS parameters determined from packets that are being transmitted through access point(s).

In some embodiments, the coverage-assessment network device 102 is any client device (e.g., 106) (e.g., wireless transmit/receive unit (WTRU), user equipment (UE), a mobile station, a fixed or mobile subscriber unit, a pager, a cellular telephone, a personal digital assistant (PDA), a mobile Internet device (MID), a mobile computing device, e.g., laptop, tablet, smart phone, etc.) configured with a coverage-assessment manager that is configured to perform the coverage-assessment operation described herein. In some embodiments, the coverage-assessment network device 102 is a wireless sensor that is used to evaluate and optimize network configuration and wireless infrastructure (e.g., simulate real-world Wi-Fi experience, test connectivity, speed, coverage). An example of a wireless sensor that can be configured as a coverage-assessment network device is the wireless Cisco Aironet 1800s Active Sensor (manufactured by Cisco Technology, Inc), which is configured to provide Wireless Performance Analytics, Real-time Client Troubleshooting, and Proactive Health Assessment. In other embodiments, mobile phones, tablets and laptops can be configured with a coverage-assessment manager that can provide beacon reports to be used in the client-aware DTSC.

The access points 104 (e.g., any one of 104a-104d) may have been deployed in the network 100 or are being added to the network 100. The access points 104 generally provide access to the network 100 to client network devices (e.g., 106a-106j). Each, or one or more, of the access points 104 (e.g., 104a-104d) may be configured with a client-aware Dynamic Transmit Power Control algorithm ("client-aware DTPC") that is configured to interrogate and use transmission coverage data from the coverage assessment network device 102. Client-aware DTPC and conventional DTPC are configured to reduce the radio-frequency (RF) output power of each network transmitter to a level that minimizes the risk of interference to and from other systems, while still allowing satisfactory network performance. The client-aware DTPC performs such operation using coverage information as collected by the coverage-assessment network device 102. The access points (e.g., 104) are configured to transmit an 802.11h Transmit Power Control (TPC) constraint frame to define local rules for maximum transmit power on a station to cap a maximum allowed transmission power.

To provide the active feedback from the coverage-assessment network device 102 to the access point, in some embodiments, neighbor access points are configured to transmit the assessed RF coverage information via inter-AP beacons. In some embodiments, the Cisco's Neighbor Discovery Protocol (NDP) is used to monitor and manage observed RF coverage and to provide over the air (OTA) messages between access points of such observations. The NDP is an auto RF feature and is a part of Ratio Resource Management (RRM).

In other embodiment, to provide the active feedback from the coverage-assessment network device 102 to the access point, the access point may request an enhanced multi-band operation (MBO) beacon report from the coverage-assessment network device 102 that provides a list of neighboring ratio's DL RSSI information, as observed at the coverage-assessment network device 102.

Active Feedback Via Inter-AP Beacon

Figure 2A:
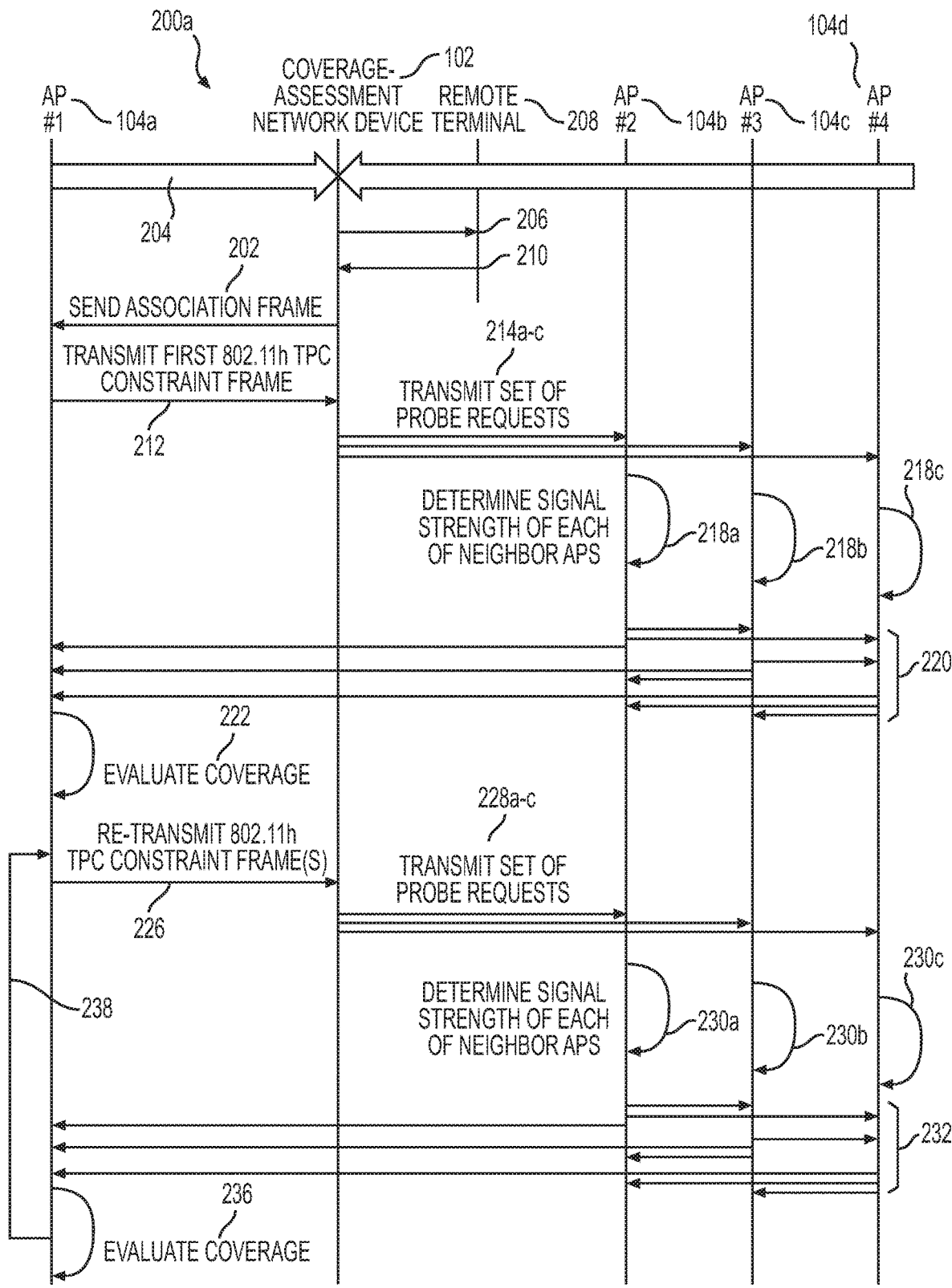
FIG. 2A is a diagram illustrating operations by access points and the coverage-assessment network device to dynamically adjust RF coverage of the network based on active feedback transmitted through inter-AP beacons, in accordance with an illustrative embodiment.

FIG. 2A is a diagram 200a illustrating operations by the access points (shown as "AP #1 104a", "AP #2 104b", "AP #3 104c", and "AP #4 104d") and the coverage-assessment network device 102 to dynamically adjust RF coverage of the network 100 based on active feedback (e.g., to optimally set the transmission (Tx) power of the radio without oversaturation) transmitted through inter-AP beacons (e.g., via the NDP protocol), in accordance with an illustrative embodiment.

As shown in FIG. 2A, the coverage-assessment network device 102 is configured to first associate (step 202) with a target AP radio by transmitting an association frame. The association process establishes a data link between an access point and a WLAN client. In some embodiments, prior to transmission of the association frame (202), the access points (e.g., 104a-104d) send out (step 204) beacon frames to advertise their presence to the coverage-assessment network device 102. The beacon frame generally includes the SSID and BSSID of the access point. In this example, the access point (AP #1) 104a transmits (step 204) a beacon frame with the SSID and BSSID associated with the network 100 to the coverage-assessment network device 102. The coverage-assessment network device 102 presents (step 206), in some embodiments, the SSID information at a coverage-assessment manager that is accessed via a remote terminal 208, which receives (step 210) an input from the user to initiate re-configuration of the RF coverage. The coverage-assessment network device 102 may gather information about the APs by scanning the channels one by one either through passive scanning or active scanning. In passive scanning, the coverage-assessment network device 102 is configured to move the radio into each channel and to wait to listen for beacons on the channel. The coverage-assessment network device 102 listens for beacons containing SSID that it may have already connected to before. If the coverage-assessment network device 102 receives beacons from multiple APs for the same SSID, it may attempt to connect to the AP with the best RSSI (receiver signal strength indicator). In other embodiments, the coverage-assessment network device 102 is pre-programmed with the SSID of a network and provides an association frame to that SSID.

Received signal strength indicator (RSSI), in some embodiments, is associated with a measurement of power present in a received radio signal. RSSI information, in some embodiments, are organized in a list, which ranks devices based on how the device hears other AP's (e.g., as a receiving neighbor) and how other AP's hear the device (e.g., as the transmitting neighbor).

Referring still to FIG. 2A, following the receipt of the association frame by access point #1 (104a), the access point (104a) transmits (step 212) a Tx Power constraint (802.11h TPC) to the coverage-assessment network device 102. In some embodiments, the 802.11h TPC constraint frame is initiated with an initial power level value that is transmitted to the coverage-assessment network device 102. The initial power level can be a device maximum power level, a user-defined operable maximum power level, or any other initial broadcast power level at which the coverage-assessment network device 102 can maximumly transmit subsequent packets to access points in the network.

In some embodiments, the access point (104a) sets the transmission power at the maximum power and then reduce the maximum power in set of a pre-defined increments (e.g., in the 3 dB steps). The coverage-assessment network device 102 receives the transmitted power constraint and, in response, sends (steps 214a-c) a probe request to each of all of the known neighboring APs (in this example, shown as AP #2 104b, AP #3 104c, and AP #4 104d). The probe request is used to determine an associated signal strength between the coverage-assessment network device 102 and each of the one or more neighbor access points (e.g., 104b-104d).

In some embodiments, the access point (e.g., 104a) can identify the capability of the coverage-assessment network device 102 to determine a set of 802.11h TPC Constant Min/Max, e.g., based on the DL RSSI information sent by the coverage-assessment network device 102. The set of 802.11h TPC Constant Min/Max thus serves as the boundary of inputs for the client-aware DTSC algorithm. Indeed, with the min/max boundary, an access point does not have to map the RF coverage for each potential power level but can use benchmarks within defined min/max limits.

Referring still to FIG. 2A, each neighbor access point (e.g., 104b-104d) is configured to then assess (steps 218a, 218b, 218c) the associated signal strength with the coverage-assessment network device 102. The neighbor access point then provides (220) the assessed signal strength with coverage-assessment network device to other neighbor access points through an inter-AP beacon frame. In some embodiments, the inter-AP beacon frame is an NDP frame. In some embodiments, the inter-AP beacon frame is a CCX (Cisco Compatible Extensions) frame. In some embodiments, the provided frame/messages includes the 802.11h TPC power level, Probe request information, and Beacon Report information. In some embodiments, the Probe Request information available at the AP is then normalized with station's beacon report (also referred to as a beacon frame). Beason report, in some embodiments, advertise the presence of an AP in an area (e.g., SSID and BSSID), its capabilities (e.g., supported rates), and some configuration and security information (e.g., parameter sets that indicate channel number, security requirement, e.g., WEP or WPA, etc., Traffic Indication Map (TIM)) to the client devices. In some embodiments, the normalization process includes determining an AP's downlink (DL) transmit power using how well the probes were received from the station and including the DL transmit power with a tag number. Because of the potential for transmit-power asymmetricity between AP and the station, e.g., in which weaker transmitting probes received by the AP may not necessarily translate to client hearing AP with a weaker signal, the coverage-assessment network device 102, in some embodiments, is configured with Wi-Fi Agile Multiband protocol to provides Beacon reports from the station to the AP to allows an AP's to gather client centric view of AP's DL signal. In the instant embodiment, once the access point receives probe information which is the UL (uplink RSSI), the access point may then normalize (e.g., concatenation operation; quotient operation; difference operation; or average operation) the UL information with Beacon report's information carrying DL signal. Indeed, any observed difference can be accounted for prior to adjusting of the AP's signal. For example, in an embodiment, the access point may normalize the beacon report information with the probe information per Equation 1.

$$\text{Normalized RSSI} = \text{average}(\text{RSSI of beacon report}, \text{RSSI of probe}) \quad \text{(Equation 1)}$$

As discussed above, other normalization operation may be performed.

Access point #1 (104a) then aggregates the received assessed signal strength (e.g., RSSI) between the coverage-assessment network device 102 and each of the neighbor access points to determine (step 222) whether a coverage parameter value associated a number, or a percent, of neighbor access points has exceeded a pre-defined client signal threshold for the transmitted power level defined in the 802.11h TPC constraint frame and/or whether the coverage parameter value has crossed a pre-defined coverage threshold or is within a range of coverage (e.g., a coverage between about 50% and 60%). In some embodiments, the AP radio's optimal Tx power is the Tx power when at least X % of neighboring AP listen to the sensor of which signal strength in probe request is above the system defined client coverage threshold. Indeed, if the coverage parameter value does not meet the condition, the access point (104a) may continue to adjust the transmission power levels with the coverage-assessment network device 102 to evaluate (steps 224) other transmission power levels until the coverage condition is met.

As shown in FIG. 2A, the assessment at another transmission power level may include re-transmitting (step 226) a Tx Power constraint (802.11h TPC) to the coverage-assessment network device 102 (e.g., at a next power level reduction). The coverage-assessment network device 102 receives the transmitted power constraint with the reduced power level and, in response, sends (steps 228a-c) probe request to the neighboring APs (e.g., 104b-104d). Each neighbor access point (e.g., 104b-104d) then assesses (steps 230a, 230b, 230c) the associated signal strength with the coverage-assessment network device 102. The neighbor access point then provides (232) the assessed signal strength with the coverage-assessment network device 102 to other neighbor access points through the inter-AP beacon frame. Access point #1 (104a) then again aggregates the received assessed signal strength (e.g., RSSI) between the coverage-assessment network device 102 and each of the neighbor access points to determine (step 222) whether the revised coverage parameter value has exceeded a pre-defined client signal threshold for the transmitted power level defined in the 802.11h TPC constraint frame and/or whether the coverage parameter value has crossed a pre-defined coverage threshold or is within a range of coverage (e.g., a coverage between about 50% and 60%). The process may be repeated (step 238) until the specified coverage condition is met.

In addition to 802.11h TPC (transmit-power control) constraint frame, compatible extension program and proprietary information element (IE) and action frames can be used to control, or constraint, the maximum transmission level of a given station (e.g., client device; or coverage-assessment network device). For cellular LTE (Long-Term Evolution) networks, UE's uplink transmit power can be similarly control using conventional power control and fractional power control schemes.

In some embodiments, an access point (or manager) uses the normalized probe RSSI to identify false positives and/or false negatives in the coverage hole events. Because the 802.11h TPC power constraint is known, AP's reporting weaker RSSI from the clients can further request for operating power levels and constants of the clients. To this end, a client device operating on relatively lower transmission power can be differentiated from a client device operating at its highest TPO.

Active Feedback Via Beacon Report with the Coverage-Assessment Network Device

Figure 2B:
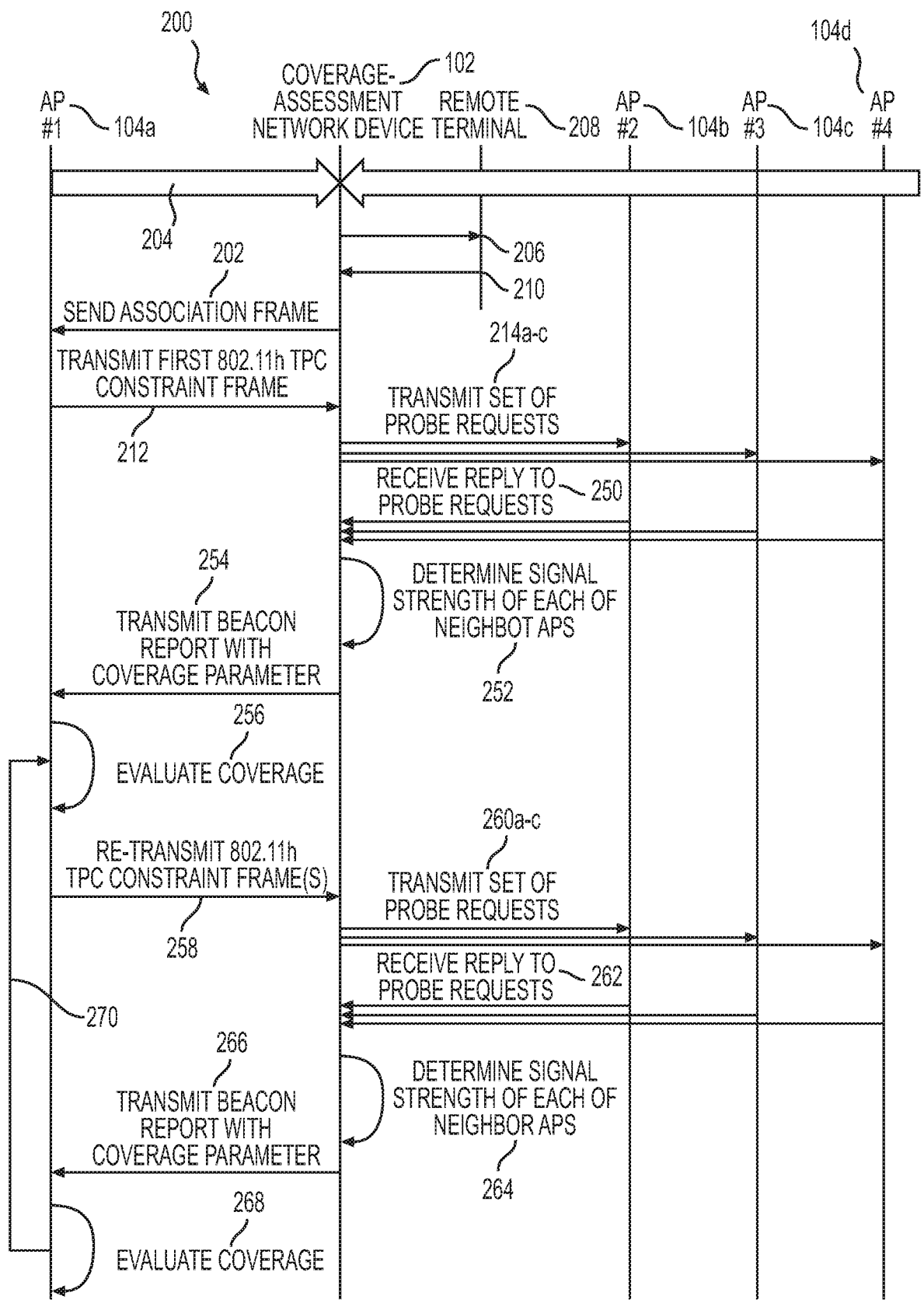
FIG. 2B is a diagram illustrating operations by the access points and the coverage-assessment network device to dynamically adjust RF coverage of the network based on active feedback transmitted through the coverage-assessment network device, in accordance with an illustrative embodiment.

FIG. 2B is a diagram 200b illustrating operations by the access points (shown as "AP #1 104a", "AP #2 104b", "AP #3 104c", and "AP #4 104d") and the coverage-assessment network device 102 to dynamically adjust RF coverage of the network 100 based on active feedback (e.g., to optimally set the transmission (Tx) power of the radio without over-saturation) transmitted through coverage-assessment network device 102, e.g., via an enhanced MBO beacon report, in accordance with an illustrative embodiment.

As shown in FIG. 2B, the coverage-assessment network device 102 is configured to first associate (step 202) with a target AP radio by transmitting an association frame. Prior to transmission of the association frame (202), the access points (e.g., 104a-104d) may send out (step 204) beacon frames to advertise their presence to the coverage-assessment network device 102. The coverage-assessment network device 102 may present (step 206) the SSID to a coverage-assessment manager that is accessed via a remote terminal 208, which receives (step 210) an input from the user to initiate re-configuration of the RF coverage.

Referring still to FIG. 2B, following the receipt of the association frame by access point #1 (104a), the access point (104a) transmits (step 212) a Tx Power constraint (802.11h TPC) to the coverage-assessment network device 102. In some embodiments, the 802.11h TPC constraint frame is initiated with an initial power level value that is transmitted to the coverage-assessment network device 102. The initial power level can be a device maximum power level, a user-defined operable maximum power level, or any other initial broadcast power level at which the coverage-assessment network device 102 can maximumly transmit subsequent packets to access points in the network. The coverage-assessment network device 102 receives the transmitted power constraint and, in response, sends (steps 214a-c) a probe request to each of all of the known neighboring APs (in this example, shown as AP #2 104b, AP #3 104c, and AP #4 104d). The probe request is used to determine an associated signal strength with each of the one or more neighbor access points (e.g., 104b-104d).

In some embodiments, the coverage-assessment network device 102 receives (step 250) probe responses from access points (e.g., 104b-104d) to which the probe request was set. The coverage-assessment network device 102, in some embodiments, is configured to then assess (step 252) whether a coverage parameter value associated a number, or a percent, of neighbor access points has exceeded a pre-defined client signal threshold for the transmitted power level defined in the 802.11h TPC constraint frame. The coverage-assessment network device 102 then provides (254) the coverage parameter value to the access point (104a), which evaluates (step 256) whether the coverage parameter value crosses a pre-defined coverage threshold or is within a range of coverage (e.g., a coverage between about 50% and 60%). Indeed, if the coverage parameter value does not meet the condition, the access point (104a) may continue to evaluate (steps 224) other transmission power levels until the condition is met. As shown in FIG. 2B, the assessment at another transmission power level may include re-transmitting (step 258) a Tx Power constraint (802.11h TPC) to the coverage-assessment network device 102 (e.g., at a next power level reduction). The coverage-assessment network device 102 receives the transmitted power constraint with the reduced power level and, in response, sends (steps 260a-c) probe request to the neighboring APs (e.g., 104b-104d). The coverage-assessment network device 102 then receives (step 262) probe responses from the access points (e.g., 104b-104d), assesses (step 264) the revised coverage parameter value, and provides (266) the revised coverage parameter value to the access point (104a) for evaluation (step 268). The process may be repeated (step 270) until the specified coverage condition is met.

RF Coverage Map

FIG. 3 is a diagram showing generation of the coverage parameter value of FIG. 2 in accordance with an illustrative embodiment. In this example, the coverage-assessment network device 102 sends probe request and beacon report to five neighboring access nodes based on the 802.11h TPC trigger. From test results, it is observed that when the power constraint is 14 dBm, a majority of neighboring AP can cover the coverage-assessment network device 102 with a −85 dBm coverage. To this end, the transmit power control for the coverage-assessment network device 102 should be set at 14 dBm as optimal transmit power for this localized neighborhood and coverage-assessment network device's position.

More specifically, as shown in FIG. 3, the access point #1 (104a) may transmit (212) a Tx Power constraint (802.11h TPC frame) to the coverage-assessment network device 102 with a maximum transmit power constraint of "20 dB" (302). The coverage-assessment network device 102 receives the transmitted power constraint (302) and, in response, sends (steps 214a-c) a probe request to each of all of the known neighboring APs (in this example, shown as AP #2 104b, AP #3 104c, AP #4 104d as well as AP #5 104e and AP #6 104f). The signal strength between the coverage-assessment network device 102 and the neighbor access points are then determined either by the coverage-assessment network device 102 (e.g., via step 252) or the neighbor access points (e.g., steps 218a-218c). As shown in FIG. 3, the determined signal strength between the coverage-assessment network device 102 and the access points 104b-104f are "−65 dB", "−68 dB", "−72 dB", "−68 dB", and "−65 dB", respectively, which are each greater than a good signal strength threshold of −84 dB, as used in this example. Thus, the coverage parameter value is 100% (shown via box 306) since 100% of the assessed neighbor access points has good signal strength with the coverage-assessment network device 102.

Referring still to FIG. 3, the access point #1 (104a) may then transmit (220) a Tx Power constraint (802.11h TPC frame) to the coverage-assessment network device 102 with a second transmit power constraint of "17 dB" (308). The coverage-assessment network device 102 receives the transmitted power constraint and, in response, sends (steps 228a-c) a probe request to each of all of the known neighboring APs (e.g. 104b-104f). The signal strength between the coverage-assessment network device 102 and the neighbor access points is then determined either by the coverage-assessment network device 102 (e.g., via step 264) or the neighbor access points (e.g., steps 230a-230c). As shown in FIG. 3, the determined signal strength between the coverage-assessment network device 102 and the access points 104b-104f are "−69 dB", "−73 dB", "−76 dB", "−73 dB", and "−69 dB", respectively, which are each still greater than a good signal strength threshold of −84 dB. Thus, the revised coverage parameter value is still 100% (shown via box 312) since 100% of the assessed neighbor access points has still good signal strength with the coverage-assessment network device 102.

Referring still to FIG. 3, the access point #1 (104a) may then re-transmit (220) another Tx Power constraint (802.11h TPC frame) to the coverage-assessment network device 102 with a third transmit power constraint of "14 dB" (314). The coverage-assessment network device 102 receives the transmitted power constraint and, in response, re-sends (steps 228a-c) a probe request to each of all of the known neighboring APs (e.g. 104b-104f). The signal strength between the coverage-assessment network device 102 and the neighbor access points is then determined either by the coverage-assessment network device 102 (e.g., via step 264) or the neighbor access points (e.g., steps 230a-230c). As shown in FIG. 3, the determined signal strength with access points 104b-104f are "−75 dB", "−85 dB", "−80 dB", "−85 dB", and "−75 dB", respectively, of which about 60% is greater than a good signal strength threshold of −84 dB. Thus, the revised coverage parameter value is now 60% (shown via box 318) since 60% (or 3 of 5 devices) of the assessed neighbor access points has good signal strength with the coverage-assessment network device 102. At this point, the access point #1 accepts, in some embodiments, this transmitted power constraint level as the setting for the network RF coverage (e.g., if the coverage parameter value is set between 40% and 60%).

In other embodiments, the access point #1 may continue to map out the RF coverage for each of the lower transmitted power constraint level, e.g., at "11 dB" (320a), "8 dB" (320b), "5 dB" (320c), "2 dB" (320d), etc. In this example, the RF coverage at the lower transmitted power constraint level yielded coverage parameter values of 50% (322a), 40% (322b), 0% (322c), and 0% (322d), respectively. As shown in FIG. 3, the transmit power control levels of "11 dB" and "8 dB" provide a coverage of 40% with the neighboring access points with signal strength (e.g., RSSI) greater than −84 dB (324a) and the transmit power levels of "5 dB" and "2 dB" provide a coverage of 0% with the neighboring access points with signal strength (e.g., RSSI) greater than −84 dB (324b).

In some embodiments, a wireless LAN controller (WLC), or other like central entity, is used to collect benchmarks AP's RSSI sent by the AP and its neighbor at varying power levels from a coverage-assessment network device (e.g., active sensor). Once the benchmarks are collected, the system can specify a percent level which represents the percentage of APs covering the station (i.e., of the coverage-assessment network device) with a defined RSSI cutoff. For example, in FIG. 3, for a cutoff of −84 dBm RSSI cutoff, 100% of the APs are able to cover the client when transmit power is 20 dBm or 17 dBm. Similarly, 60% of the APs can cover this client with power level 14 dBm.

In some embodiments, an access point is configured to evaluate a QoS parameter (e.g., WLAN Priority, DSCP, User Priority, AVC, etc.) and/or latency criteria against the normalized probe RSSI to determine optimal Tx Power. In such embodiments, for example, if a majority of the clients are running background-traffic or best-effort-traffic, then the client-aware DTSC is configured to select the optimal Tx power based on a "conservative" normalized probe RSSI (e.g., between about −75 dBm to −79 dBm RSSI). And, if clients are running higher QoS and latency operations (e.g., voice/video applications), then the majority of the client-aware DTSC is then configured to select the optical Tx power based on "heightened" normalized probe RSSI (e.g., at least −67 dBm RSSI).

Figure 4A:
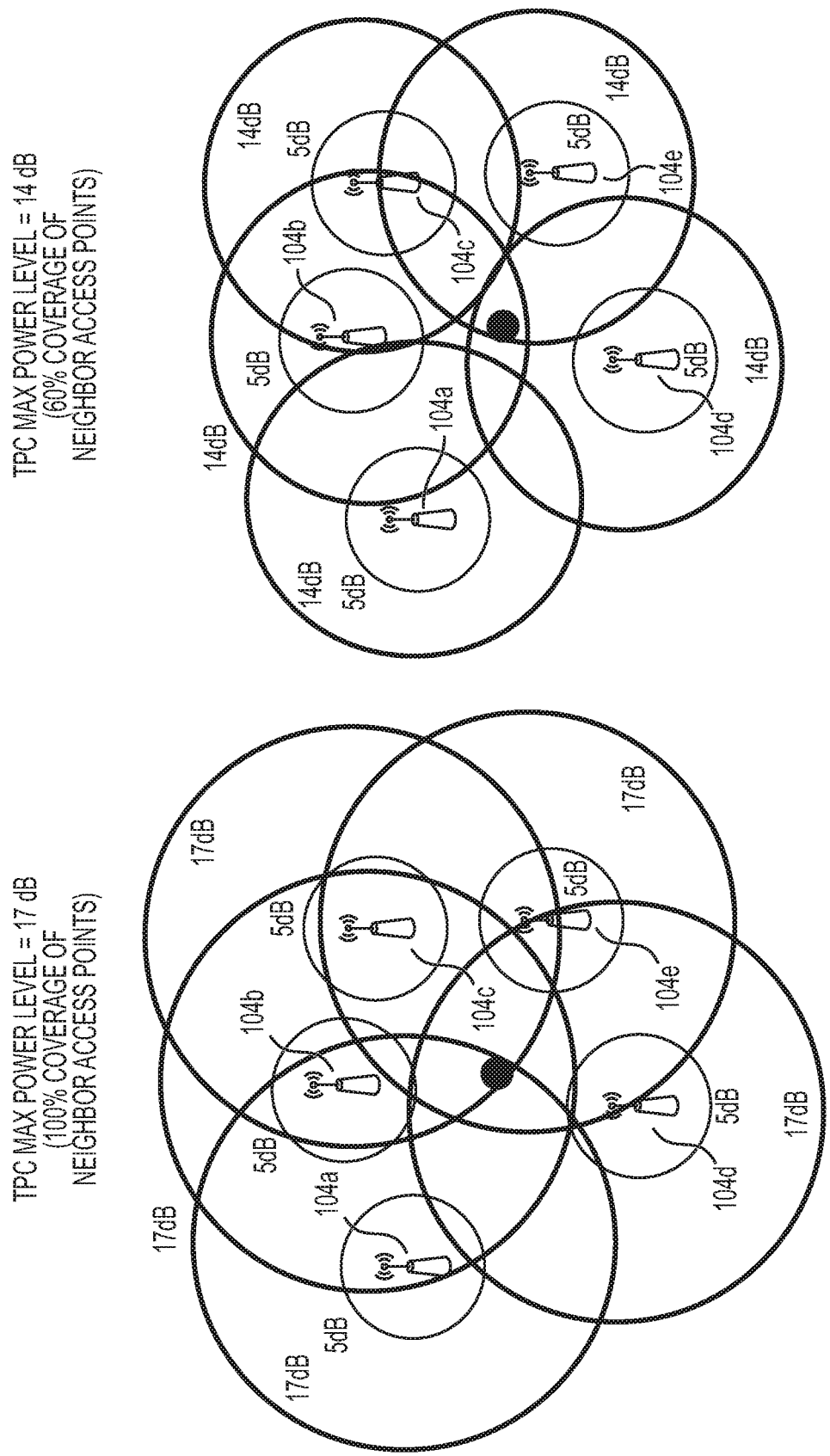
FIGS. 4A and 4B each shows example RF coverage of the network at different transmit-power control levels, in accordance with an illustrative embodiment.
Figure 4B:
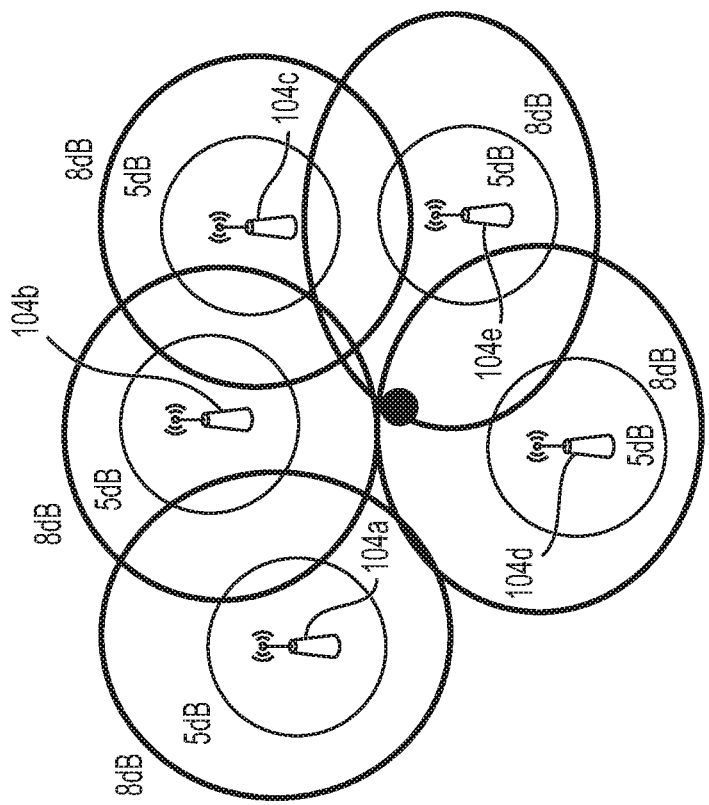
Figure 4B:
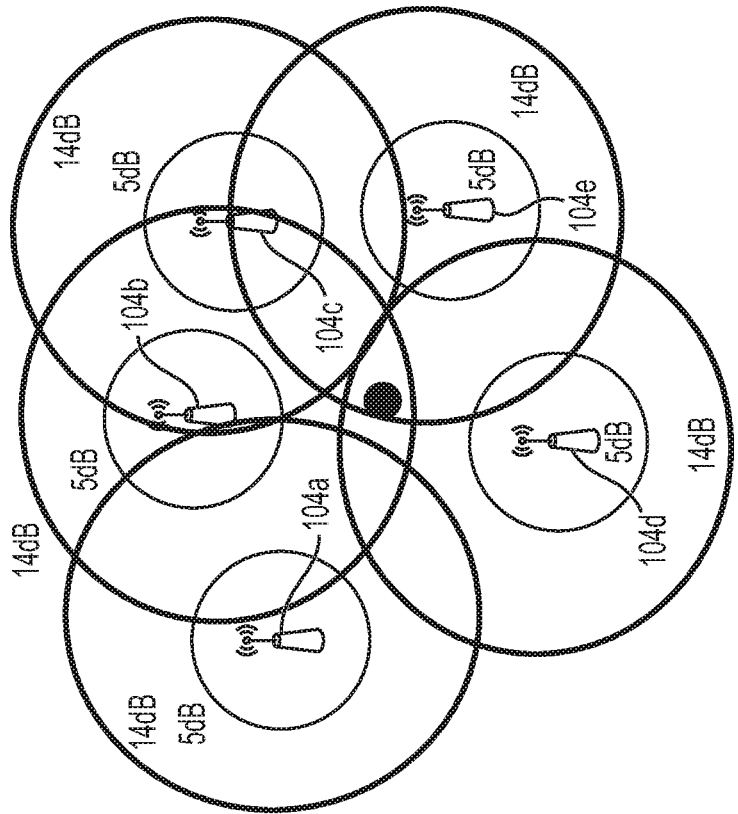

FIGS. 4A and 4B each shows example RF coverage of the network 100 at different transmit-power control levels, in accordance with an illustrative embodiment. FIG. 4A shows RF coverages for a TPC constraint level of 17 dB (402) and 14 dB (404), respectively, between the coverage-assessment network device 102 and the neighbor access points 104a-104f). As shown in FIG. 3, this provides for RF coverage between 100% of neighbor devices (312) and 60% of neighbor devices (318). FIG. 4B shows the RF coverages for a TPC constraint level of 14 dB and 8 dB, respectively, between the coverage-assessment network device 102 and the neighbor access points 104a-104f). As shown in FIG. 3, this provides for RF coverage between 60% of neighbor devices (218) and 40% of neighbor devices (322b).

Notably, it can be observed in FIG. 4A that at 60% of neighbor device coverage, the coverage-assessment network device 102 (and likely other client WLAN device) would have coverage at a sufficiently good receiver strength for its intended use/applications and/or quality-of-service while having less co-channel interference, e.g., as compared to 100% of neighbor device coverage. Indeed, the client-aware Dynamic Transmit Power Control algorithm executing on the access point #1 104a in selecting a constraint transmit power that provides 60% coverage by neighbor access point ensures that clients located at a cell edge still receive sufficient coverage from access points and have sufficient overlap with adjacent cells for seamless roaming for the wireless stations while minimizing co-channel interference.

Figure 5:
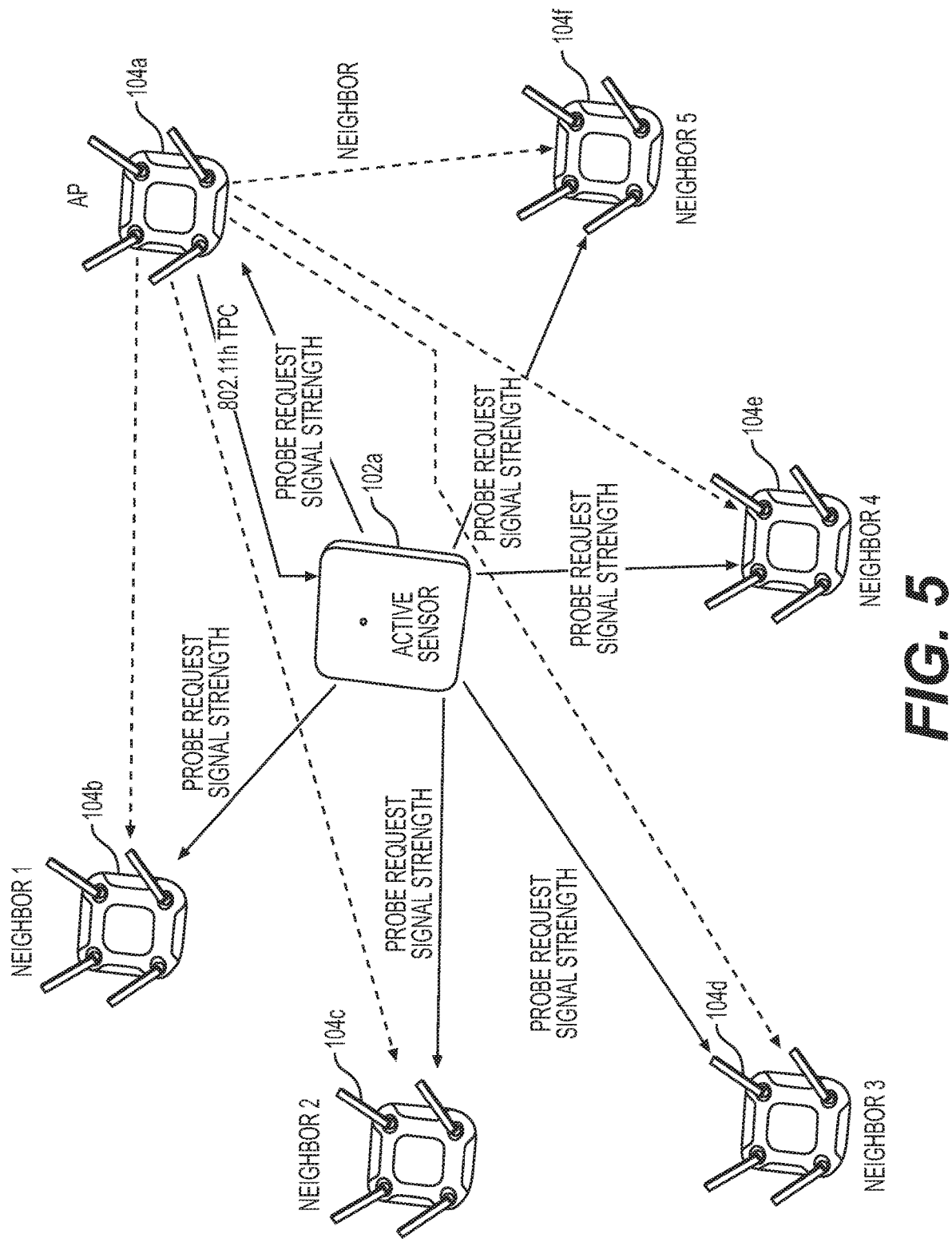
FIG. 5 is a diagram of a network with a coverage-assessment network device configured to provide active feedback to access points to limit transmit power control of the access points in servicing other client network devices, in accordance with an illustrative embodiment.

FIG. 5 is a diagram of a network 100 with an Active Sensor 102a configured to provide active feedback to access points 104 (shown as 104a, 104b, 104c, 104d) to limit transmit power control of the access points in servicing other client network devices 106 (shown as 106a-106i), in accordance with an illustrative embodiment.

As shown in FIG. 5, the Active Sensor 102a first associates with a target AP radio 104a. The AP 104a then sends Tx Power constraint (802.11h TPC) to the sensor 102a. In some embodiments, the 802.11h TPC Constraint is initiated at the max power and then reduced in pre-defined increments (e.g., −3 dB increments). When the sensor 102a receives the updated power constraint, the sensor 102a sends a probe request to all known neighboring APs, to the extent that its reachable. The AP 104a and neighboring APs (e.g., 104b-104f) shares the 802.11h TPC, Probe request information in beacon reports that are transmitted among the Aps. Each AP (e.g., 104a-104f) then normalizes sensor's probe request information available at the AP with station's beacon report. The AP selects the radio's optimal Tx power as the Tx power when at least X % of neighboring AP listen to the sensor of which signal strength in probe request is above the system defined client coverage threshold. Optionally, the AP 104a can request for an enhanced MBO beacon report from the sensor 102a to provide a list of neighboring radio's DL RSSI information at the sensor.

The coverage-assessment network device and access point devices may be implemented in general-purpose or special purpose computing devices environments, virtual network environment, or configurations. Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

An exemplary system for implementing aspects described herein includes a computing device, such as computing device. In its most basic configuration, computing device typically includes at least one processing unit and memory. Depending on the exact configuration and type of computing device, memory may be volatile (such as random access memory (RAM)), non-volatile (such as read-only memory (ROM), flash memory, etc.), or some combination of the two.

Computing device typically includes a variety of computer readable media. Computer readable media can be any available media that can be accessed by the device and includes both volatile and non-volatile media, removable and non-removable media.

Computer storage media include volatile and non-volatile, and removable and non-removable media implemented in any method or technology for storage of information such as computer readable instructions, data structures, program modules or other data. Memory, removable storage, and non-removable storage are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device. Any such computer storage media may be part of computing device.

Computing device may contain communication connection(s) that allow the device to communicate with other devices. Computing device may also have input device(s) such as a keyboard, mouse, pen, voice input device, touch input device, etc. Output device(s) such as a display, speakers, printer, etc. may also be included. All these devices are well known in the art and need not be discussed at length here.

It should be understood that the various techniques described herein may be implemented in connection with hardware components or software components or, where appropriate, with a combination of both. Illustrative types of hardware components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. The methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described exemplary embodiments, but should be defined only in accordance with the following claims and their equivalents.

What is claimed is:

1. A system comprising:
a processor; and
a memory having instructions stored thereon, wherein execution of the instructions by the processor cause the processor to:
receive an association frame from a network device configured to assess coverage of access points in a campus network having a defined geographic area;
transmit to the network device a first 802.11h TPC (transmit-power control) constraint frame, or an IE/action frame, designating a first power level at which the network device can maximumly transmit subsequent packets to access points in a network, wherein the network device is configured to transmit, following receipt of the first 802.11h TPC constraint frame, or the IE/action frame, a set of probe requests to one or more neighbor access points, wherein each of the set of probe requests is used to determine an associated signal strength with each of the one or more neighbor access points;
receive from the network device a beacon report, or determine from data in the beacon report, a coverage parameter value that is associated with a number, or a percent, of the one or more neighbor access points having exceeded a pre-defined client signal threshold for the first power level defined in the first 802.11h TPC constraint frame;
re-transmit, to the network device, one or more second 802.11h TPC constraint frames designating a set of second power levels at which the network device can maximumly transmit subsequent packets to access points in the network, wherein each of the set of second power levels has a value different from that of the first power level, wherein the one or more second 802.11h TPC constraint frames are re-transmitted until the coverage parameter value crosses a pre-defined coverage threshold or is within a range of coverage; and
transmit at least one of i) parameters in the first or one or more second 802.11h TPC constraint frames, ii) data in the received probe requests, and iii) data in the received beacon reports to at least one of the one or more neighbor access points, wherein the at least one of the i) parameters of the first or one or more second 802.11h TPC constraint frames, ii) the data in the received probe requests, and/or iii) the data in the received beacon reports is used by the one or more neighbor access points to establish a 802.11h TPC constraint frame to send to the network device.

2. The system of claim 1, wherein each of the set of second power levels has a value that is less than that of the first power level.

3. The system of claim 1, wherein the pre-defined coverage threshold is between about 40 percent and about 60 percent of the one or more neighbor device covered.

4. The system of claim 1, wherein the pre-defined coverage threshold is user selectable.

5. The system of claim 1, wherein the set of probe requests triggers a set of corresponding probe responses from the one or more neighbor access points, wherein each of the set of corresponding probe responses includes a received signal strength indication between the network device and a given neighbor access point of the one or more neighbor access points.

6. The system of claim 1, wherein the instructions by the processor further cause the processor to:
transmit to the network device a request for the beacon report.

7. The system of claim 6, wherein the beacon report comprises a list of neighboring radio's received signal strength indicator (RSSI) information collected at the network device.

8. The system of claim 1, wherein a probe request, of the set of probe requests, received from the network device in response to receipt of the first 802.11h TPC (transmit-power control) constraint frame, or the IE/action frame, is used to normalize a beacon report prepared by the system to be transmitted to neighbor access points in the network.

9. The system of claim 1, wherein the pre-defined client signal threshold is set based on a selected QoS policy or a selected latency performance operation.

10. The system of claim 1, wherein each of the one or more second 802.11h TPC constraint frames includes a pre-defined adjustment in current power level.

11. The system of claim 1, wherein the second power levels have values that adjust the power level according to a pre-defined linear relationship or a pre-defined exponential relationship.

12. The system of claim 1, wherein the instructions by the processor further cause the processor to:
receive from the network device, a set of capability parameters associated with the network device,
wherein the set of capability parameters are used to determine a minimum or maximum power level to be used in the 802.11h TPC Constraint frame.

13. The system of claim 1, wherein at least one of the first power level of the first 802.11h TPC constraint frames and one or more of the set of second power levels of the one or more second 802.11h TPC constraint frames are determined from a QoS parameter and/or a latency criterion parameter.

14. The system of claim 1, wherein the network device is configured to conduct coverage assessment of access points in the campus network based on defined policies.

15. The system of claim 1, wherein the instructions by the processor further cause the processor to:
identify potential incorrect assessment of a coverage hole events by comparing a neighbor RSSI to a last power level transmitted in a last 802.11h TPC (transmit-power control) constraint frame to the network device.

16. The system of claim 1, wherein the network device is a mobile phone, mobile device, tablet device, or laptop device having instructions executing thereon that generate the beacon report.

17. The system of claim 1, wherein the instructions by the processor further cause the processor to:
normalize the received beacon report of the network device with one or more received beacon reports of the one or more neighbor access points.

18. A system comprising:
a network interface;
a processor; and
a memory having instructions stored thereon, wherein execution of the instructions by the processor cause the processor to:
transmit an association frame to a first access point;
receive from the first access point a first 802.11h TPC (transmit-power control) constraint frame, or an IE/action frame, designating a first power level at which the network interface can maximumly transmit subsequent packets to access points in a network;
transmit a set of probe requests to one or more neighbor access points;
receive a set of corresponding probe responses, wherein the set of corresponding probe responses is used to determine an associated signal strength with each of the one or more neighbor access points for the first power level;
transmit a beacon report comprising the associated signal strength, or a coverage parameter value derived therefrom, wherein the coverage parameter value corresponds to a number, or a percent, of the one or more neighbor access points having exceeded a pre-defined client signal threshold for the first power level defined in the first 802.11h TPC constraint frame; and
for each second 802.11h TPC constraint frames received from the first access point, wherein each second 802.11h TPC constraint frames designates one of a set of second power levels at which the network interface can maximumly transmit subsequent packets to access points in the network, i) transmit one of a set of probe requests to the one or more neighbor access points, ii) determine an associated signal strength with each of the one or more neighbor access points for that power level, and iii) transmit the beacon report comprising the determined associated signal strength, or a coverage parameter value derived therefrom, for that second 802.11h TPC constraint frame;
wherein each of the set of second power levels has a value different from that of the first power level, wherein the first access point is configured to re-transmit one or more second 802.11h TPC constraint frames until the coverage parameter crosses a pre-defined coverage threshold or is within a range of coverage.

19. A method comprising:
transmitting, from a network device, to a first access point, an association frame;
transmitting, from the first access point, to the network device, a first 802.11h TPC (transmit-power control) constraint frame, or an IE/action frame, designating a first power level at which the network device can maximumly transmit subsequent packets to access points in a network;
transmitting, from the network device, to one or more neighbor access points, a set of probe requests, wherein each of the set of probe requests is used to determine an associated signal strength with each of the one or more neighbor access points;
transmitting, from the network device, to the first access point, a beacon report, or determine, by the first access point, from data in the beacon report, a coverage parameter value that is associated with a number, or a percent, of the one or more neighbor access points having exceeded a pre-defined client signal threshold for the first power level defined in the first 802.11h TPC constraint frame;
re-transmitting, from the first access point, to the network device, one or more second 802.11h TPC constraint frames designating a set of second power levels at which the network device can maximumly transmit subsequent packets to access points in the network, wherein each of the set of second power levels has a value different from that of the first power level, wherein the one or more second 802.11h TPC constraint frames are re-transmitted until the coverage parameter value crosses a pre-defined coverage threshold or is within a range of coverage; and
transmitting, from the first access point or the network device, at least one of i) parameters in the first or one or more second 802.11h TPC constraint frames, ii) data in the received probe requests, and iii) data in the received beacon reports to at least one of the one or more neighbor access points, wherein the at least one of the i) parameters of the first or one or more second 802.11h TPC constraint frames, ii) the data in the received probe requests, and/or iii) the data in the received beacon reports is used by the one or more neighbor access points to establish a 802.11h TPC constraint frame to send to the network device.

* * * * *